US012237998B2

(12) United States Patent
Uberoy et al.

(10) Patent No.: US 12,237,998 B2
(45) Date of Patent: Feb. 25, 2025

(54) METHOD AND APPARATUS FOR DISTRIBUTING NETWORK TRAFFIC OVER MULTIPLE COMMUNICATION NETWORKS

(71) Applicant: ViaSat, Inc., Carlsbad, CA (US)

(72) Inventors: Pawan Uberoy, Carlsbad, CA (US); Hari Balasubramanian, Carlsbad, CA (US); Praveen Madhav, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 17/716,983

(22) Filed: Apr. 8, 2022

(65) Prior Publication Data
US 2022/0239589 A1    Jul. 28, 2022

Related U.S. Application Data

(63) Continuation of application No. PCT/US2019/053567, filed on Sep. 27, 2019.

(51) Int. Cl.
*G06F 15/16* (2006.01)
*H04L 45/00* (2022.01)
*H04L 45/24* (2022.01)
*H04L 47/2441* (2022.01)
*H04L 47/283* (2022.01)

(52) U.S. Cl.
CPC ............. *H04L 45/38* (2013.01); *H04L 45/24* (2013.01); *H04L 47/2441* (2013.01); *H04L 47/283* (2013.01)

(58) Field of Classification Search
CPC ...... H04L 45/38; H04L 45/24; H04L 47/2441
See application file for complete search history.

(56) References Cited

U.S. PATENT DOCUMENTS

| | | | |
|---|---|---|---|
| 6,658,003 B1 * | 12/2003 | Sugai | H04L 49/205 370/428 |
| 6,731,639 B1 * | 5/2004 | Ors | H04L 45/50 370/395.54 |
| 6,778,495 B1 | 8/2004 | Blair | |
| 6,931,512 B2 | 8/2005 | Dillon et al. | |
| 7,315,900 B1 * | 1/2008 | Ofelt | H04L 47/624 709/245 |

(Continued)

OTHER PUBLICATIONS

Broadband Agregation in the rural areas of Denmark, Jais Langkow Kristensen, Aalborg University Electronics and IT, Jun. 2, 2016.
International Search Report for PCT/US2019/053567.

*Primary Examiner* — Hieu T Hoang
(74) *Attorney, Agent, or Firm* — Chang & Hale LLP

(57) ABSTRACT

A traffic split transmission ("TST") system capable of transmitting a data flow via multiple communication networks is disclosed. The TST system, in one aspect, includes a receiver, a link selector, a split unit, a tag module, and a delay module. The receiver obtains a data flow containing one or more packets with a destination at a user terminal ("UT"). The link selector fetches link characteristics associated with the current status of available links. The split unit splits the data flow into a first and a second packets. The tag module generates tags for the first and the second packets. The delay module is configured to delay transmission of a selected packet(s) so that the first packet and the second packet can arrive at UT at approximately the same time.

20 Claims, 8 Drawing Sheets

(56) References Cited

U.S. PATENT DOCUMENTS

| | | | |
|---|---|---|---|
| 7,965,721 B1* | 6/2011 | Gunasekara | H04L 12/66 370/401 |
| 8,125,989 B2 | 2/2012 | Kissel | |
| 8,595,478 B2 | 11/2013 | Haney | |
| 8,897,211 B2 | 11/2014 | Benco et al. | |
| 9,203,770 B2 | 12/2015 | Soffer et al. | |
| 9,350,657 B2 | 5/2016 | Gross, IV et al. | |
| 9,491,098 B1 | 11/2016 | Wilson et al. | |
| 10,051,645 B2* | 8/2018 | Arvidson | H04L 5/0048 |
| 10,601,602 B2* | 3/2020 | Arnal | H04L 45/24 |
| 2003/0043798 A1* | 3/2003 | Pugel | H04B 7/18582 370/389 |
| 2004/0037313 A1* | 2/2004 | Gulati | H04L 12/56 370/465 |
| 2004/0196798 A1 | 10/2004 | Abousleman | |
| 2004/0218626 A1* | 11/2004 | Tyldesley | H04N 21/631 370/464 |
| 2004/0223475 A1* | 11/2004 | Hong | H04W 28/14 370/310.2 |
| 2005/0129020 A1* | 6/2005 | Doyle | H04L 69/14 370/392 |
| 2007/0206501 A1* | 9/2007 | Alesi | H04L 47/125 370/468 |
| 2009/0019505 A1* | 1/2009 | Gopalakrishnan | H04L 1/1838 725/109 |
| 2012/0188873 A1* | 7/2012 | Nakatsugawa | H04L 47/34 370/231 |
| 2012/0281541 A1* | 11/2012 | Palmer | H04L 47/20 370/389 |
| 2013/0003549 A1* | 1/2013 | Matthews | H04L 41/0668 370/235 |
| 2013/0003993 A1* | 1/2013 | Michalski | H04B 7/1851 381/119 |
| 2013/0229979 A1* | 9/2013 | Liu | H04L 1/1893 370/328 |
| 2013/0235885 A1* | 9/2013 | Chen | H04L 25/14 370/468 |
| 2013/0310108 A1 | 11/2013 | Altman | |
| 2016/0301593 A1 | 10/2016 | Blair et al. | |
| 2017/0054649 A1* | 2/2017 | Mamidwar | H04L 65/612 |
| 2017/0099508 A1* | 4/2017 | Hamzeh | H04W 28/10 |
| 2017/0187629 A1* | 6/2017 | Shalev | H04L 65/40 |
| 2018/0026846 A1* | 1/2018 | Walker | H04W 72/51 370/228 |
| 2018/0242218 A1 | 8/2018 | Muscariello et al. | |
| 2018/0367583 A1 | 12/2018 | Khabinov et al. | |
| 2020/0169918 A1* | 5/2020 | Hwang | H04L 45/245 |
| 2020/0204484 A1* | 6/2020 | Altman | H04L 47/125 |
| 2020/0413299 A1* | 12/2020 | Zhang | H04L 67/56 |
| 2021/0076238 A1* | 3/2021 | Zhou | H04W 28/0268 |
| 2021/0114616 A1* | 4/2021 | Altman | H04W 8/205 |

* cited by examiner

METHOD AND APPARATUS FOR DISTRIBUTING NETWORK TRAFFIC OVER MULTIPLE COMMUNICATION NETWORKS

PRIORITY

This application claims the benefit of priority based upon the PCT Application Ser. No. PCT/US2019/053567, filed on Sep. 27, 2019, entitled "Method and Apparatus for Distributing Network Traffic Over Multiple Communication Network", the disclosure of which is hereby incorporated into the present application by reference in its entirety.

FIELD

The exemplary embodiment(s) of the present disclosure relates to communication networks. More specifically, the disclosed embodiment(s) of the present application relates to traffic distribution via multiple communication networks.

BACKGROUND

With increasing popularity of electronic devices, such as computers, smart phones, mobile devices, server farms, mainframe computers, and the like, the demand for more and faster digital information is constantly growing. To handle and facilitate voluminous digital data between end users and content providers, high-speed and high-capacity computer networks are typically utilized. A conventional approach to provide a high-speed and high-capacity computer network is to use a sophisticated telecom infrastructure such as additional network devices to increase transmission bandwidth. A drawback, however, associated with a conventional network is that a typical network is a single communications channel or link which often is insufficient to deliver a desirable performance due to insufficient bandwidth, less than optimal quality of service, latency, continuity, jitter behavior, and/or data throughput. Some embodiments of the present invention address these and/or other shortcomings in the prior art.

SUMMARY

Some embodiments of the present disclosure disclose a process or apparatus capable of splitting a data transmission through one or more communication networks. The apparatus can include a receiver, a link selector, a split unit, a tag module, an encapsulate module, and a delay module. The receiver, for example, obtains a data flow containing one or more packets with a destination at a user terminal ("UT"). The link selector is operable to fetch link characteristics which indicate up-to-date status associated with a set of currently available links connected to a core node ("CN"). For example, the split unit can split packets of the data flow into multiple sub-flows each for transmission over one of the available communication links. The tag module generates tags for the packets. The encapsulate module encapsulates the packets for transmission over a corresponding link. The delay module may delay the transmission of selected packets so that the packets arrive at UT in the approximate original order of the packets of the data flow as received by the CN.

Additional features and benefits of the exemplary embodiment(s) of the present disclosure will become apparent from the detailed description, figures and claims set forth below.

BRIEF DESCRIPTION OF THE DRAWINGS

The exemplary embodiment(s) of the present disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
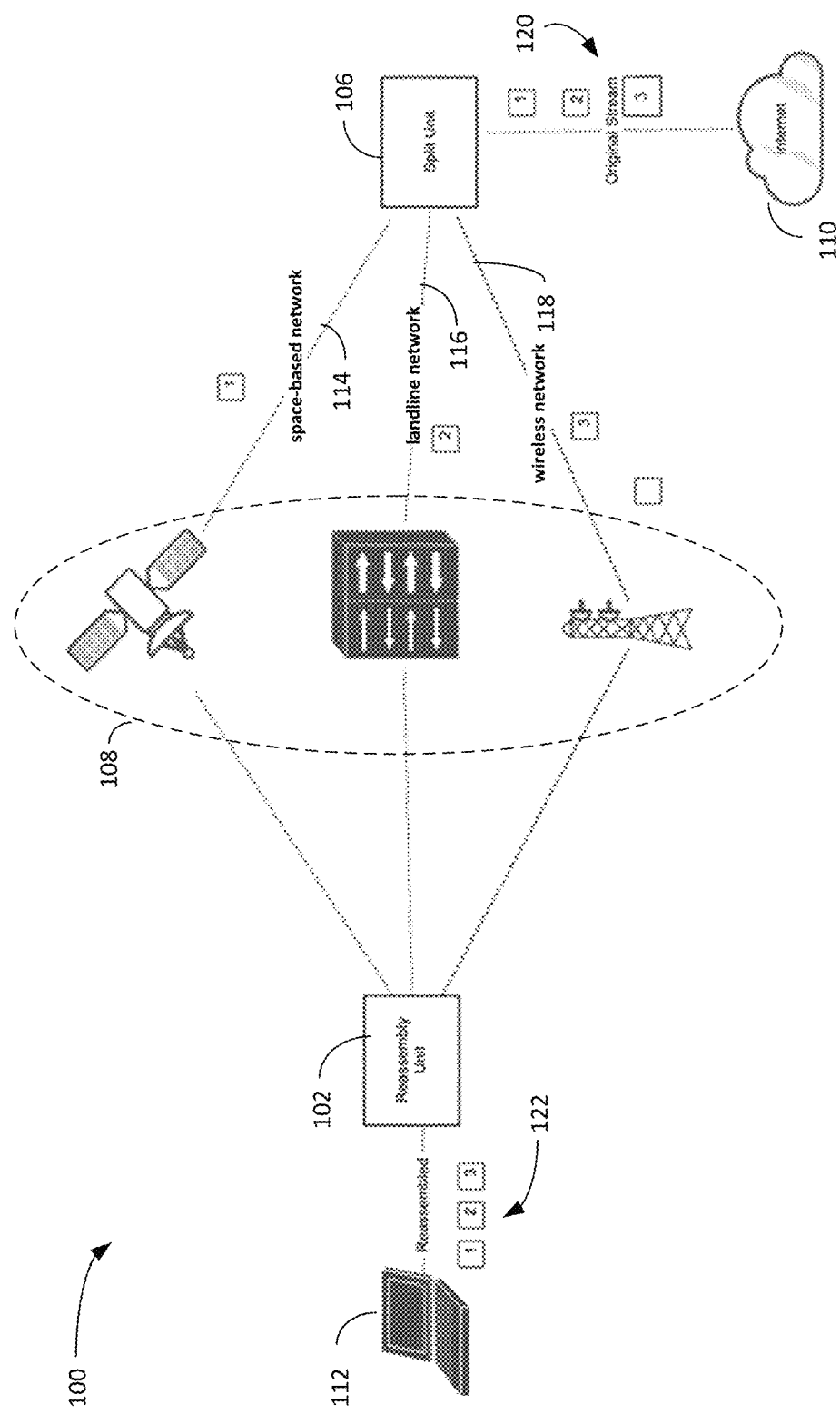
FIG. 1 is a block diagram illustrating a traffic splitting transmission ("TST") system able to transmit a data flow via multiple communication channels or links in accordance with some embodiments of the present disclosure.

Exemplary embodiment(s) of the present disclosure is described herein in the context of a method, device, and apparatus for optimizing large volume data distribution using multiple communication networks.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present disclosure illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skill in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

The following exemplary terms may be used to refer to a network for the illustrative purposes. The terms, however, should not be taken to limit the disclosure to any one or more embodiments, but are for explanation and understanding only relating to a network. IP communication network, IP network, or communication network, for example, can mean any type of network having an access network able to transmit data in the form of packets or cells, such as ATM (Asynchronous Transfer Mode) type, on a transport medium, for example, the TCP/IP or UDP/IP type. ATM cells, for instance, are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), 5G, or DVB-H (Digital Video Broadcasting-Handhelds)), or a hybrid (satellite and terrestrial) network.

Some embodiments of the present disclosure disclose a traffic splitting transmission ("TST") system which is capable of transmitting a data flow or data stream through multiple communication networks or links by splitting the original data flow into multiple packets, sub-flows, or chunks. The TST system includes a user terminal ("UT") and a core node ("CN") wherein the CN contains a receiver, a link selector, a split unit, a tag module, an encapsulate module, and a delay module. While the CN includes a split unit for splitting incoming traffic, the UT includes a reassembly unit for restoring the received data flow into its original form before the split transmission.

For example, upon obtaining a data flow containing one or more packets with destination of a UT, the link selector fetches the link characteristics which indicate the latest status associated with the currently available links connected to the CN. If the conditions for split transfer are met, the split unit splits the data flow into multiple sub-flows or packets such as, for example, a first packet and a second packet. After generating tags sub-flows or packets such as the first and the second packets, the encapsulate module encapsulates the packets using various different link protocols. The delay module is capable of delaying the transmission of certain packet(s) for a predefined time period in response to the link characteristics whereby the packets such as the first packet and the second packet can arrive at UT at approximately the same time or in approximately the original order (sequence) of the packets in the data flow as received at the CN.

FIG. 1 is a block diagram 100 illustrating a TST system able to transmit a data flow via multiple communication channels, networks, or links in accordance with some embodiments of the present disclosure. In some embodiments, diagram 100 includes a CN containing a split unit 106, a UT containing a reassembly unit 102, and multiple communication channels, networks, or links 108. Reassembly unit 102 is further coupled to a user or user equipment ("UE") 112. Split unit 106 is coupled to the Internet 110. It should be noted that the underlying concept of the exemplary embodiment(s) of the present disclosure would not change if one or more blocks (or devices) were added to or removed from diagram 100. Although element 110 is labeled the Internet, element 110 can be any similar type of network including private networks and combinations of the Internet and a private network or networks.

Networks 108, in one aspect, can include various different types of communication networks including, but not limited to, landline networks 116, wireless networks 118, and space-based networks 114. A space-based network 114, for example, can comprise a satellite or network of satellites capable of providing data communication between two locations via a satellite in space or orbit. It should be noted that space-based network 114 can provide satellite Internet which is a modern communication technology capable of facilitating web-access to information by transmitting radio signals from orbit around the earth. Various satellites are deployed for retransmitting radio signals from one ground base station to another ground base station covering a large area of geographic territory. To simplify forgoing discussion, the term "satellite network" is used to refer to any type of space-based and/or satellite network.

Wireless network 118, in one aspect, can include a cellular network, Wi-Fi network, Bluetooth network, wireless hotspot, and/or the like. A cellular network, also known as a mobile network, is a communications network including wired and/or wireless communication network(s). For example, the last link of a cellular network usually is wireless connection via various cell towers and/or base stations. A cellular network generates, broadcasts, or distributes radio signals across a designated geographic area wherein the geographic area is generally divided into cells. Each cell of a cellular network serves one or more transceivers. It should be noted that a cell may use a different set of frequencies from neighboring cells for minimizing noise and/or cross interferences.

Wi-Fi is a wireless technology using radio wavelengths facilitating signal transmission within a wireless local area networking (WLAN) environment which is standardized in accordance with the IEEE 802.11 standards. A Wi-Fi client is a device connected to a Wi-Fi (wireless) network wherein the client is capable of transmitting and receiving wireless data or network traffic. A node is generally an actual physical computer, server, or a cluster of computers and/or servers capable of processing and distributing network traffics. A core is a processing system or a group of systems within a node.

Landline networks 116, in one example, include, but are not limited to, a cable network, an optical network, a digital subscriber line ("DSL"), and the like. A landline network can be a dedicated physical cable or connection. Any of the networks 114, 116, and/or 118 can comprise multiple types of links (e.g., a land based link such as a fiber optic link and a satellite).

The TST system, in some embodiments, provides a method to create and manage multiple network links or connections such as networks 108 for transmitting a data flow based on a set of predefined policies. The predefined policies, for example, may include "all video flows," "all flows from a particular server," "all file downloads exceeding a size threshold (e.g., 10 megabits ("MB"))," "periodic data backup from a laptop," and the like. The identified data stream may be split into multiple smaller data streams, sub-flows, or packets. The packets are subsequently transmitted to their destination via multiple communication links such as networks 108. It should be noted that each communication link 108 generally has a set of performance characteristics, such as speed, bandwidth, congestion, quality of service, and the like at least some of which may be different or unique. Upon arrival to UT, the data packets or packets are reassembled to restore the data flow to its original format or order.

In one aspect, different performance characteristics associated with different communication networks or links 108 include link throughput, link goodput, link temporal jitter, link latency, quality of service, bandwidth, network technology, and/or types of link. Based on the real-time update of the performance characteristics, the input stream or data flow is classified and then split into smaller sub-streams, packets, or sub-flows. The sub-flows or packets are subsequently transmitted to their destinations in accordance with the chosen set of communication links. It should be noted that selecting or choosing communication link(s) is based on the data type and the characteristics of currently available links.

Each packet or sub-stream can be suitably encapsulated in a tunnel using a tunneling scheme such as GRE (Generic Routing Encapsulation), VXLAN, or the like header for identifying the sequence or location of the packet in the input stream. At the end of tunneling transmission, decapsulation is performed and the decapsulated packets and meta data are sent to reassembly unit 102. Reassembly unit 102 puts together the individual packets or sub-streams into a proper order resembling the original data flow. It should be noted that transmitting a data flow through multiple links may involve consideration of differences in link latencies, throughput, network loss, and/or other factors. The reassembled packet stream is then forwarded to the destination or user equipment 112.

In operation, a dataflow 120 containing multiple packets (three are shown but there can be many more) travels from Internet 110 to split unit 106. After classification, dataflow 120 can be split based on the type of data and currently available channels. Upon splitting, packet 1 is transmitted to UT via space-based network 114 and packet 2 is transmitted to UT via landline link 116. Packet 3 is transmitted via wireless link 118. After arrival to UT, reassembly unit 102 restores dataflow 122 back to its original dataflow as dataflow 120 by ordering the packets within the restored dataflow 122. The foregoing is a simplified example in which three packets of a data flow are split among three links. In practice, the packets of a data flow may be split into multiple groups of packets and each group of packets sent over one of the links 108.

An advantage of some embodiments of the TST system is that it keeps the source and destination of the stream unaware of the implementation of the disclosure.

Figure 2:
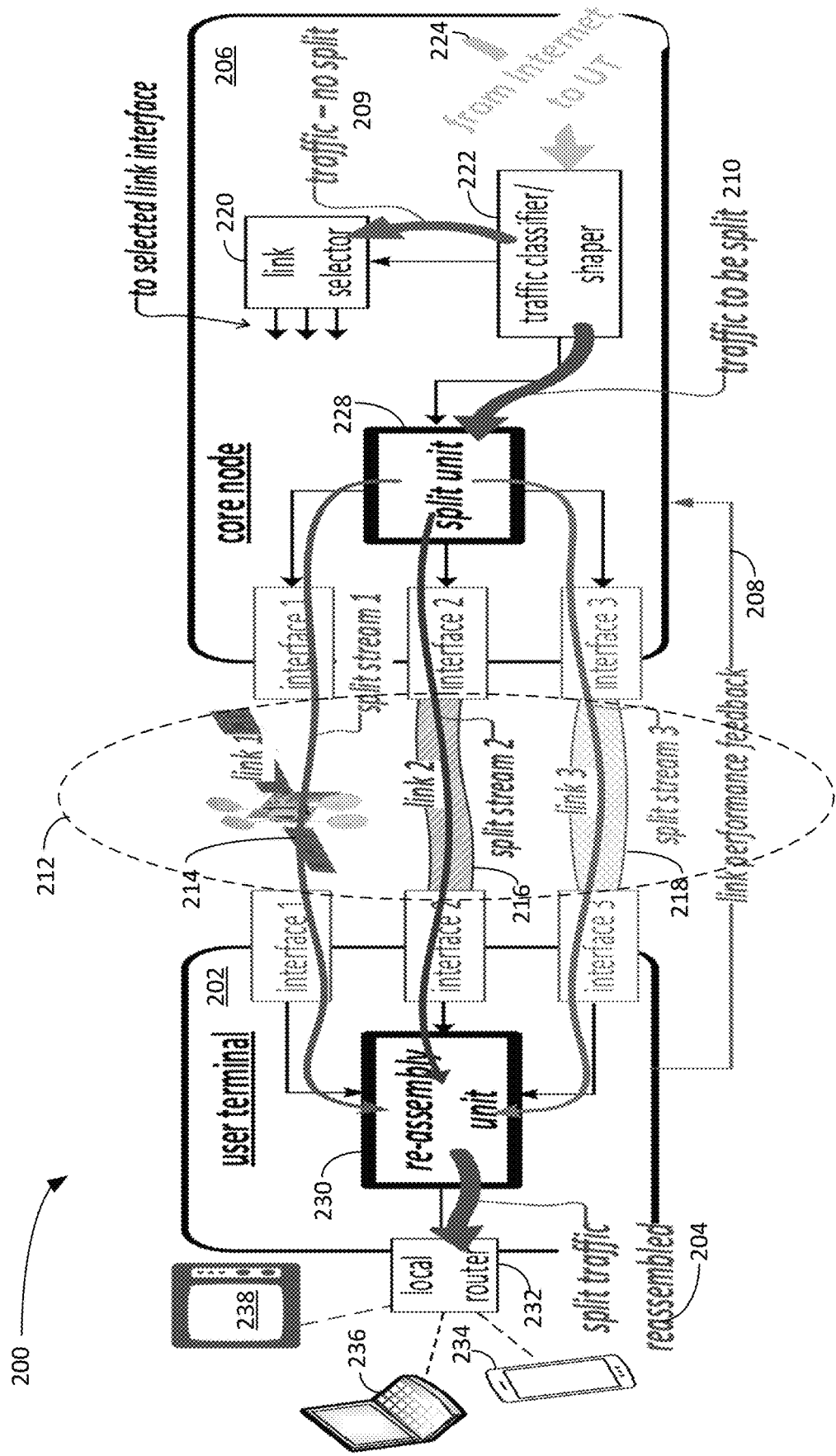
FIG. 2 is a block diagram illustrating a TST system containing a core node and a user terminal for optimal data transmission via a set of networks in accordance with some embodiments of the present disclosure.

FIG. 2 is a block diagram 200 illustrating a TST system containing a core node 206 and a user terminal 202 for optimal data transmission via a set of networks in accordance with some embodiments of the present disclosure. Diagram 200 includes CN 206, UT 202, local router 232, UEs 234-238, and a set of network links 212 (three are shown but there can be more or fewer). UEs 234-238, for example, can be a smart phone 234, a laptop 236, a tablet 238, a personal computer (PC), or other types of portable or fixed user device(s), and are coupled to local router 232. It should be noted that the underlying concept of the exemplary embodiment(s) of the present disclosure would not change if one or more blocks (or devices) were added to or removed from diagram 200.

CN 206, in some embodiments, includes link selector 220, traffic classifier/shaper 222, split unit 228, and interfaces 1-3 (three are shown but there can be more or fewer). CN 206, in one example, comprises a router, a switch, a hub, a network device, a network server, and/or a combination of router(s), switch(es), hub(s), network device(s), and/or server(s). It should be noted that CN 206 may include additional modules and components but addition or removal of any block should not change the underlying concept of CN.

Traffic classifier 222, also known as data flow classifier, is able to classify or determine the data type associated with some incoming data flows such as data flow 224. The data types include, but are not limited to, streaming video, movies, data backups, live sports, games, interactive gaming, video conference, video images, audio data, real-time data, et cetera. A function of traffic classifier 222 is to identify the data type. Based on the identified data type and/or other considerations, traffic classifier 222 determines whether to split the data flow before transmission.

Link selector 220, in one aspect, is to transmit data flows that are not split via one of the available communication links. That is, link selector 220 provides the entirety of a data flow to one of the links 1-3. A function of link selector 220 is to decide which one of the communication links should be selected for transmitting the data flow based on the data type.

Split unit 228, in some embodiments, splits or divides a data flow into multiple sub-flows or packets. Based on the status of link characteristics associated with the currently available communication links 212 to CN 206, split unit 228 splits a data flow into multiple separable packets, sub-streams, or sub-flows. The packets or sub-flows are subsequently forwarded to interface 1, interface 2, and/or interface 3 in accordance with the link characteristics as well as data type.

The link characteristics, in one example, include link congestion, link load, rate of packet loss, quality of service, latency, continuity, jitter behavior, data throughput, and the like. It should be noted that the link characteristics are continuously updated based on feedback from UT 202 as indicated by numeral 208. In one aspect, the link characteristics associated with the currently available communication links are stored locally in CN 206.

Network links or links 212, which are similar to or the same as networks 108 in FIG. 1, include multiple currently available communication networks or links 214-218 capable of facilitating traffic transmission. For example, link 1 (214) can comprise a space-based link, link 2 (216) can comprise a landline based link, and link 3 (218) can comprise a wireless based link. Links 212 can include additional links such as Wi-Fi network and are configured to couple to UT 202 and CN 206 via various interfaces.

UT 202, in some embodiments, includes a reassembly unit 230 wherein a function of reassembly unit 230 is to assemble a data flow to its original form (e.g., sequence) based on the received sub-flows or packets from interfaces 1-3 connected to links 212. Based on the tags associated to the received packets or sub-flows, reassembly unit 230 restores the data flow to its original form as indicated by numeral 204. The restored data flow subsequently travels to its destination(s) via local router 232. Another function of UT 202 is to provide a link performance feedback 208 to CN 206 based on the detected link status, which can be determined from recently received packets. For instance, UT 202 can detect error rates for a link from recently received packets. Also, UT 202 can record the frequency of packet loss and/or noise level for each link during the transmission based on the received packet(s) or sub-flow(s).

In one aspect, a link performance module, not shown in FIG. 2, provides a periodic feedback loop 208 from UT 202 to split unit 228 regarding observed latency, jitter, packet loss, and/or bandwidth utilization relating to each link. Split unit 228 uses the feedback data to control and/or manage the process of splitting data flows for optimizing efficiency of transmission using multiple links.

The TST system illustrated in diagram 200 is capable of separating sub-flows or packets from selected data flows and transmitting the packets among the identified links via, for example, a hybrid network. In some embodiments, tags and delays of packets are implemented so that packets arrive at UT at the same or similar time whereby the arrived packets can be reassembled into a data flow or data stream with sequence numbers and time stamps for data flow restoration.

In operation, split unit 228 receives data flows such as data flows 224 whose destination is UT 202 wherein the data flows are classified for split transfer. The packets or sub-flows of a selected data flow 210 are transmitted to UT 202 via links 212. Reassembly unit 230 receives the packets or sub-stream from links 214-218 and arranges the received packets in the same order as the packets in the data flow originally arrive at split unit 222. UT 202, in one aspect, is able to provide feedback to split unit 222 regarding performance of links 212.

An advantage of using the TST system is that after split unit 228 splits an incoming large data stream into multiple smaller streams, the smaller streams are sent over multiple available network communication channels or links to their destinations. The smaller streams are subsequently reassembled into a single data stream before sending it to UEs.

As further examples of operation, the core node 206 can receive data flows (e.g., from the Internet 110). The traffic classifier/shaper 222 can identify distinct data flows and select one or more 210 for splitting into sub-data flows and transmitting each sub-data flow of the data flow over a different one of the links 212. Data flows 209 that are not selected for splitting can be provided to the link selector 220 and the entirety of each flow can be transmitted over one of the links 212 as discussed above.

A data flow 224 can be identified and distinguished from other data flows by any characteristic or combination of characteristics that distinguish one data flow from another data flow. Examples of such characteristics include the network address (e.g., internet protocol (IP) address) and/or port number (e.g., transmission control protocol (TCP) or user datagram protocol (UDP) port number) of the network entity (e.g., server on the Internet 110) that originated the data flow. Another example is the network address (e.g., IP address) and/or port number (e.g., TCP or UDP port number) to which the data flow is addressed. Other examples of characteristics that can identify a data flow include the type of data (e.g., Web data, video data, gaming data, etc.) being carried by the data flow. Other examples of characteristics that can distinguish a data flow from other data flows include service tier, MAC address, identity of the originating content provider, identify of the destination client device, media stream type, media container, video resolution, video codec, audio codec, operating system, browser, session protocol, and transport protocol. Yet additional examples include finger prints (e.g., hash generations) of selected portions of a data flow. As is known, each data flow can comprise a sequence of data packets, and the foregoing criteria can be found in or derived from each data packet. Thus, for example, as data flows are received at CN 206 each comprising a sequence of data packets, the traffic classifier/shaper 222 can identify the type of and/or specific data flow to which each packet belongs.

Figure 3:
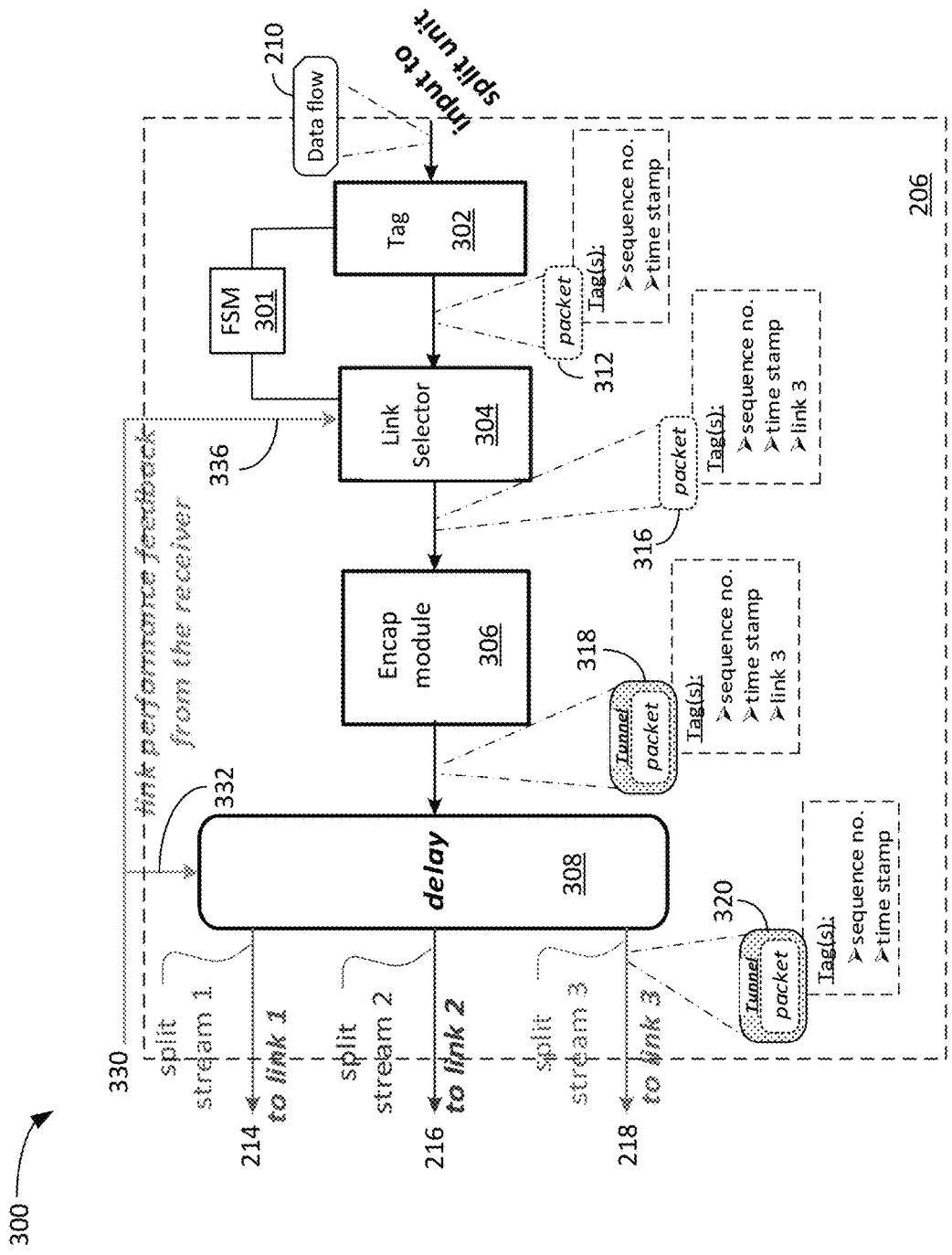
FIG. 3 is a block diagram illustrating several components of a split unit in a CN in a TST system for data transmission in accordance with some embodiments of the present disclosure.

FIG. 3 is a block diagram 300 illustrating components of an example configuration of a split unit in CN 206 in a TST system in accordance with some embodiments of the present disclosure. The split unit shown in diagram 300 includes a tag module 302, a link selector 304, an encapsulate module 306, and a delay module 308. In one aspect, the split unit also include a receiver, not shown in FIG. 3, configured to receive or obtain a data flow 210 via a traffic classifier (not shown in FIG. 3). Data flow 210 as an input can originate from various different sources, such as, but not limited to, Internet, local area network, connected host computer, local storage, and the like. As shown in FIG. 2, data flow 210 can be provided by the traffic classifier/shaper 222 as discussed above. It should be noted that the underlying concept of the exemplary embodiment(s) of the present disclosure would not change if one or more blocks (or devices) were added to or removed from diagram 300.

Tag module 302, in some embodiments, obtains a data flow 210 from a data classifier 222 indicating that data flow 210 is to be split before transmitting to its destination. Data flow 210 can be a stream of data, a stream of packets, a data stream and/or a dataflow that contains one or more packets. As noted, the packets of a data flow can have one or more particular characteristics that distinguish it from other data flows. To simplify the forgoing discussion, the term "data flow" is used to refer to a stream of data, a stream of packets, a data stream, and/or a dataflow that has the same characteristic or characteristics (e.g., as described above) such that it is a distinct data flow. For example, if a stream of packets, the packets can have a same characteristic or characteristics that identify the packets as being part of the same unique data flow as discussed above. A function of tag module 302 is to generate a tag containing at least a time stamp and a sequence number.

The time stamp indicates the arrival time of packet 210 at CN 206. The sequence number indicates a physical location in a data flow. For instance, a packet has a sequence number of 3 indicating that the packet is at the third packet position (between a second and a fourth position) of a data flow. Depending on the applications, tag module 302 may generate a tag for each packet in a data flow or a tag for each chunk, sub-flow, or packets that will be transmitted to their destinations via the same link. It should be noted that each chunk or sub-flow may include one or more packets. After attaching a tag, packet 312 is forwarded to link selector 304.

A flow split module ("FSM") 301, which is coupled to link selector 304 and tag module 302, is capable of splitting a data flow such as data flow 210 into multiple packets or sub-flows, such as a first packet and a second packet, based on the link characteristics of the currently available links as well as the data type of the data flow classified by the data classifier. For example, if all three (3) links 214-218 are available for data transmission, FSM 301 splits data flow 210 into three (3) chunks wherein each chunk may contain one or more packets. It should be noted that depending on the applications, some chucks or sub-flows contains more packets than other chunks. For example, for video streaming, a beginning portion of the video may be carried by a DSL link with smaller chunk containing a few packets while a bigger chunk containing more packets is transmitted through a satellite network since the satellite network has a larger capacity whereby a view can view the video immediately with the smaller chunk via the DSL link, and continues with the larger chunk via satellite link when the smaller chunk runs out.

Link selector 304, in one aspect, fetches a set of link characteristics associated with the currently available links and selects one or more links for transmitting the sub-flows or packets. A function of link selector 304 is to distribute and/or allocate sub-flows or packets to selected links such as links 214-218. In some embodiments, link selector 304 updates the link characteristics based on the link performance feedback from UT as indicated by numeral 336. After selection, packets 316 containing tags as well as link information to encapsulate module 306 for tunneling.

Encapsulate module 306, in one aspect, encapsulates every sub-flow or packet(s) based on which link will be used to transmit the packet(s) or sub-flow. Note that an encapsulation for transport over a land line network 116 may be different from an encapsulation for transport over another type of network such as a space-based network 114 or wireless network 118. For example, different transmission protocols may be used. Regardless a tunneling protocol (e.g., VXLAN, GRE, or the like may be used). Once the sub-flow or packets are encapsulated, the tunneled packet(s) or sub-flow 318 containing tags is forwarded to delay module 308. If, in one example, the links 214-218 are part of a hybrid network that utilizes the same hybrid network protocol, the encapsulation process may be a little simpler because all packets or sub-flows are encapsulated using the hybrid network protocol.

Delay module 308 is configured to potentially delay transmission of one or more packets or sub-flows in response to the link characteristics so that all packets or sub-flows will arrive at UT at approximately a desired time, such as, at the same time or within an expected time frame. A function of delay module 308 is to delay certain packets or sub-flows to compensate for the differences in link latencies so that the packets can arrive at UT in an approximate order which is similar to the order of the packets in the original data flow such as data flow 210 as received at the CN 206. After the predefined delay that corresponds to the link 214-216 over which a packet is to be sent, delay module 308 sends each packet to their destinations via a selected link(s) such as tunneled packet 320. In some embodiments, delay module also updates the link characteristics based on the link performance feedback as indicated by numeral 332 for improving accuracy of delay process.

In some embodiments, the delay module 308 can delay the sub-flows or packets assigned for transmission over a particular one of the links 214-218 by the difference or approximate difference between the longest currently expected transmission delay across any of the links 214-218 and the currently expected transmission delay across the particular link: $L_L - L_i = D_i$, where $L_L$ is the longest currently expected transmission delay across any of the links 214-218, $L_i$ is the currently expected transmission delay across the particular link, and $D_i$ is the delay the delay module 308 delays sub-flows or packets assigned for transmission over the particular link. Alternatively, the delay the delay module 308 delays sub-flows or packets assigned for transmission over the particular link can be proportional to or otherwise a function of the foregoing difference between $L_L - L_i$. In the foregoing discussion, the transmission delay across a link can alternatively be referred to as the latency of the link.

In operation, tag module 302 receives data flows (a stream of packets) 210 which is indicated to be split before transmission. After tagging each packet with a sequence number as well as an optional time stamp, link selector or select module 304 selects a link for each packet or packets. Upon tagging the packet or packets with a tag identifying a sequence number, time stamp, and selected link such as packet 316, encapsulate module 306 encapsulates the packet or packets using a tunneling protocol for transport to UT. Delay module 308, in some embodiments, delays the packet or packets to compensate for different latencies associated with the links whereby the packets arrive at UT at approximate the same time and/or in the same or approximately the same order as packets in the original data flow.

It should be noted that UT includes a reassembly unit which is able to restore the data flow from the chunks or packets or sub-flows wherein the restored data flow should substantially resemble the original data flow. It should be noted that tag module 302, FSM 301, link selector 304, encapsulate module 306, and delay module 308 can be hardware, firmware, software, and/or a combination of hardware, firmware, and/or software.

Figure 4:
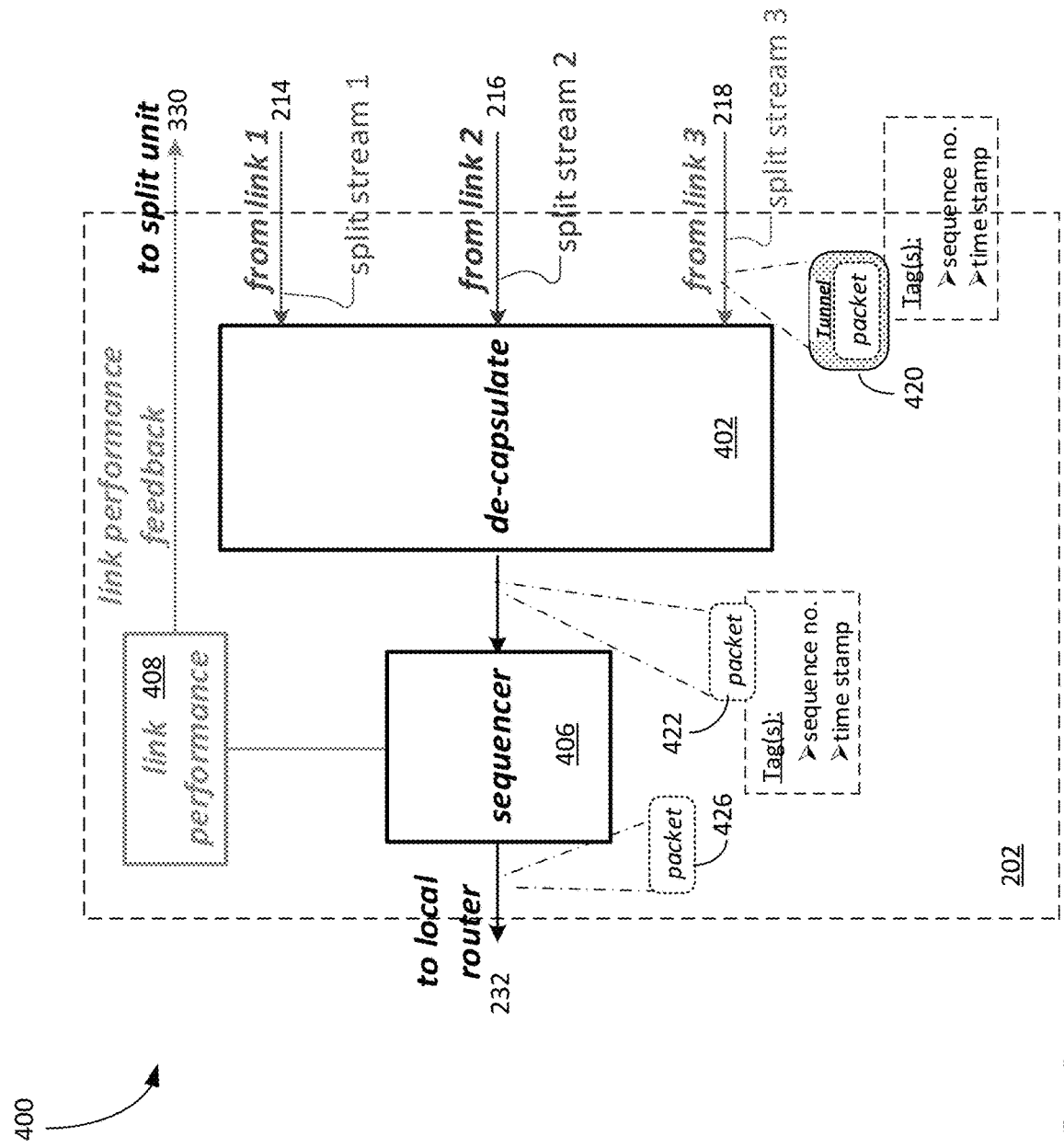
FIG. 4 is a block diagram illustrating a reassembly unit in a TST system for receiving and processing received data in accordance with some embodiments of the present disclosure.

FIG. 4 is a block diagram 400 illustrating a reassembly unit in the TST system for receiving and processing received data in accordance with some embodiments of the present disclosure. Diagram 400, in one example, includes a de-capsulate module 402, a sequencer module 406, and a link performance module 408. In one aspect, link performance module 408 provides a periodic feedback loop 330 from UT 202 to the split unit in CN regarding observed latency, jitter, packet loss, and/or bandwidth utilization on each link. It should be noted that the underlying concept of the exemplary embodiment(s) of the present disclosure would not change if one or more blocks (or devices) were added to or removed from diagram 400.

As packets are received over each link 214-218, the de-capsulate module 402, in some embodiments, de-capsulates the packets. Packet 420 is an example of one such packet received over link 3. Similar packets are received over link 1 (214) and link 2 (216). Sequencer module 406 assembles or puts received packets or sub-flows such as packet(s) 422 into an ordered sequence according to the tags which include sequence numbers and time stamps such as discussed above with respect to FIG. 3. Once the restored data flow which should be in the same or similar order or sequence as the original data flow arriving at CN, the restored data flow such as packet 426 is forwarded to local router 232 before it reaches to its destination.

Link performance module 408, in one aspect, estimates current performance of the links (e.g., using time stamp tags in the received packets) and provides dynamic link performance feedback 330 to the split unit of CN.

In operation, after receiving, by UT 202, an encapsulated packet 420 via link 218, a de-capsulated or de-tunneled packet such as packet 422 is generated by decapsulating the encapsulated packet such as packet 420. After receiving an encapsulated second packet via link 2, a second de-capsulated packet is generated by decapsulating the encapsulated second packet. Sequencer module 406 reassembles or restores a data flow using received packet 420 and second packet wherein the restored data flow should be the same or similar to the original data flow based on the tags. In one aspect, a process of TST system is capable of generating link performance feedback according to the information from detected error rate during a process of reassembling the data flow.

Figure 5:
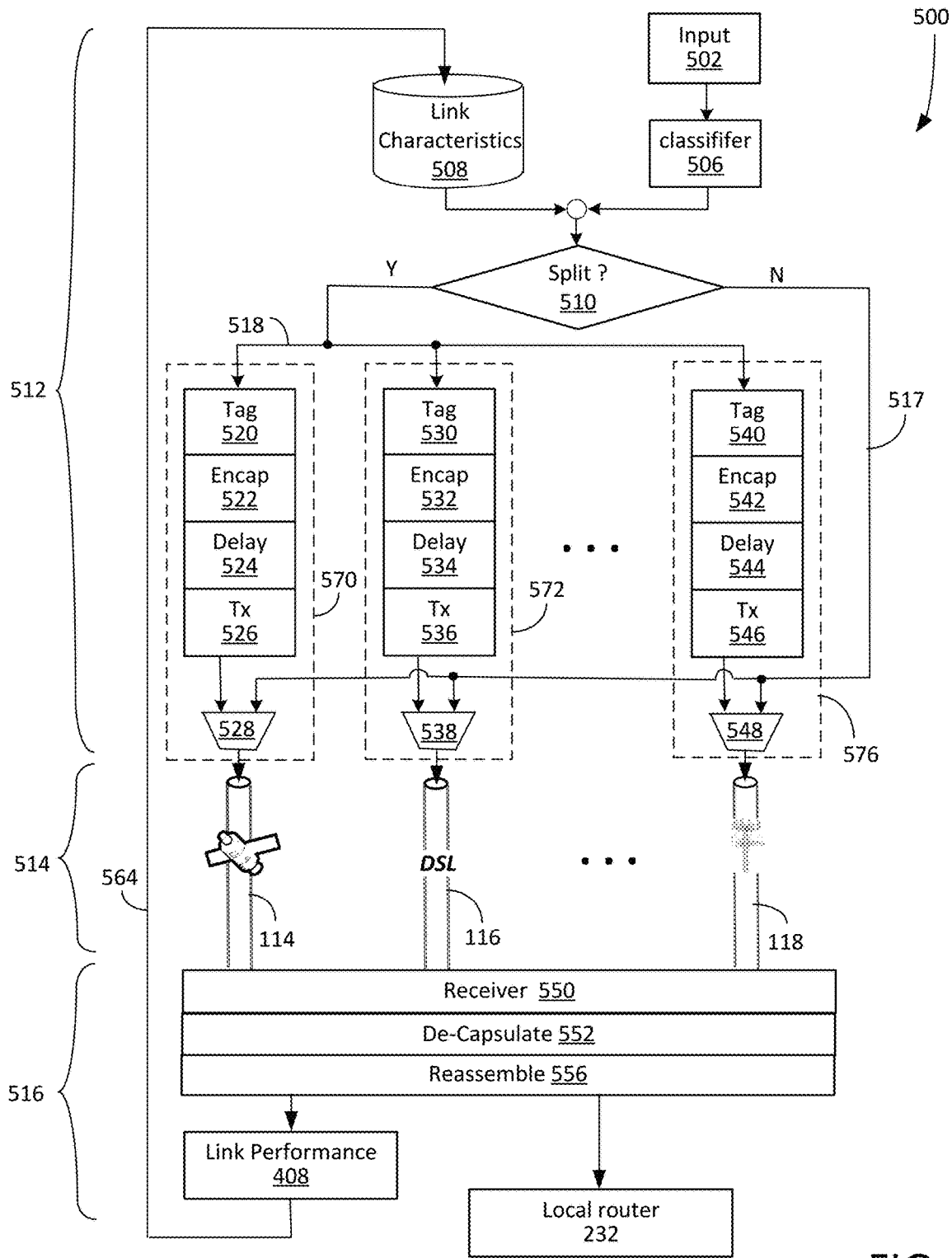
FIG. 5 is a block diagram illustrating a logic flow of a TST system using multiple links in accordance with some embodiments of the present disclosure.

FIG. 5 is a block diagram 500 illustrating a logic flow of a TST system using multiple links in accordance with some embodiments of the present disclosure. Diagram 500 illustrates a CN portion 512, a link portion 514, and a UT portion 516. For example, the CN portion 512 can correspond to the core node of FIG. 1 or the CN 206 of FIG. 2, and the UT portion 516 can correspond to the UT of FIG. 1 or the UT 202 of FIG. 2.

At block 502, a data flow as an input stream arrives at CN. After classifying the data flow at block 506, the data flow is examined to determine whether to split at block 510 in light of the information relating to the link characteristics from block 508. If no, the process proceeds to mux block 528-548 as indicated by numeral 517 based on the selection of the link selector. If, however, the data flow is to be split, the process proceeds to block 570-546 as indicated by numeral 518 based on number of splits associated with the current data flow. The split unit includes multiple vertical processing blocks 570-576 allowing parallel processing of sub-flows or packets.

In one example, a first packet split from the data flow is to be transmitted via space-based network 114. After tagging in block 520, the first packet at block 522 is encapsulated to comply with the satellite communication protocol. After delaying the first packet at block 534 for a predefined period of time, if any, the first packet at block 526 is transmitted via space-based network 114 if mux 528 is selected. Alternatively, a second packet separated from the data flow is going to be transmitted via landline network 116. After tagging in block 530, the second packet at block 532 is encapsulated to comply with a landline (e.g., DSL) communication protocol. After delaying the second packet at block 534 for a predefined period of time, the second packet at block 536 is transmitted to its destination via landline network 116 if mux 538 is selected. It should be noted that the second packet should be delay because a landline link is usually faster than a space-based link that typically comprises a satellite.

Upon receipt of packets such as first packet and second packet at block 550, the process proceeds to block 552 for de-capsulation of received packets. After de-capsulation, the packets are reassembled to restore back to the original data flow based on tags. The restored data flow is subsequently forwarded to local router 232. Link performance module 408 is capable of providing a periodic feedback loop 564 from UT 516 to CN 512 for updating link characteristics based on observed latency, jitter, packet loss and bandwidth utilization during the recent transmissions. It should be noted that CN 512 uses the feedback data to control and/or manage whether a split is desirable or not.

It should be noted that delay module 524 and transmitter 526 are configured to compensate latency differences between the links. For example, delay module 534 and transmitter 538 may delay packets assigned to landline network 116 to compensate for a latency at space-based network 114 since the satellite link generally has large bandwidth while typically being slower due the traveling distance between the base station and satellite. Note that link latency differences are continuously monitored and updated.

In one aspect, some data flows are split among the links while others are not. In some embodiments, UT provides the feedback regarding link conditions. It should be noted that the receiver uses time stamps at both transmitter and receiver to estimate link conditions, including latencies.

The exemplary aspect of the present disclosure includes various processing steps, which will further be described below. The steps of the aspect may be embodied in machine, router, or computer executable instructions. The instructions can be used to create a general purpose or special purpose system, which is programmed with the instructions, to perform the steps of the exemplary aspect of the present disclosure. Alternatively, the steps of the exemplary aspect of the present disclosure may be performed by specific hardware components that contain hard-wired logic for performing the steps, or by any combination of programmed computer components and custom hardware components.

Figure 6:
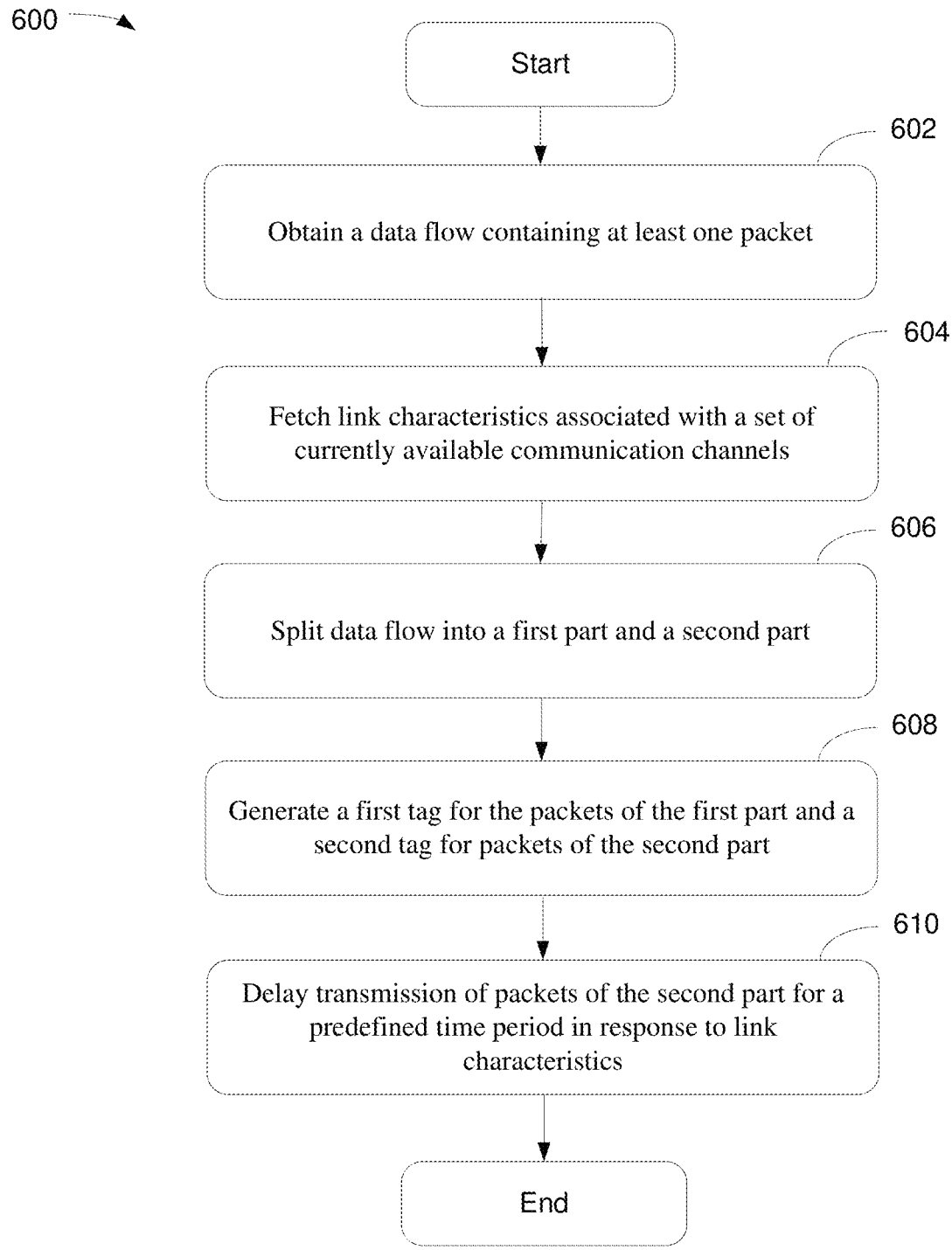
FIG. 6 is a flowchart illustrating an exemplary process of a TST system for transmitting data in accordance with some embodiments of the present disclosure.

FIG. 6 is a flowchart 600 illustrating an exemplary process of a TST system for transmitting data in accordance with some embodiments of the present disclosure. Operation of flowchart 600, as described below, can be in accordance with any of the corresponding example operations of elements of FIGS. 1-5 as discussed above.

At block 602, the process for facilitating data transmission using one or more communication networks or links is able to obtain a data flow containing at multiple data packets for traveling to a destination at UT. For example, a set of data stream or flow is received from a communication network and the data flow is subsequently classified in accordance with a set predefined policy.

At block 604, a set of link characteristics associated with a set of currently available communication channels or links to CN is fetched. For example, the process fetches the current bandwidth, traffic congestion, and transmission speed relating to a satellite network or link from a local storage in CN.

At block 606, the data flow is split into multiple parts or sub-flows such as a first part and a second part in accordance with the data type of the data flow and/or other considerations as discussed above.

At block 608, the process generates a first tag containing sequence numbers for packets of the first part and a second tag containing packet sequence numbers for packets of the second part. In one example, a tag includes a transmission time stamp.

At block 610, the process, in some embodiments, is able to delay the transmission of a packet or sub-flow such as the packets of the second part for a predefined time period in response to the link characteristics so that the packets of the data flow arrive at UT at approximately the same time or in approximately the same order (sequence) as in the data flow as received at the CN. For example, the transmission of the packets of the second part may be postponed so that the packets of the first part arrive at the UT at the same or similar time.

In one aspect, the packets of the first part are encapsulated in a first transmission protocol for transmitting the encapsulated packets of the first part through the first communication link or channel. The packets of the second part can likewise be encapsulated in a second transmission protocol for transmitting the encapsulated packets of the second part via the second communication link or channel. The encapsulated packets of the first part are subsequently transmitted to UT via the first communication channel and the encapsulated packets of the second part are transmitted to UT via the second communication channel. After receiving, by CN, the link performance feedback associated with the last transmission from UT, the link characteristics are updated based on the link performance feedback. Upon receiving, by UT, the encapsulated packets of the first part via the first communication channel, those packets are regenerated by decapsulating the encapsulated packets. In some embodiments, the data flow is reassembled or restored in accordance with the first and the second tags. The process, in one example, is capable of generating the link performance feedback based on information including error rate detected during the process of reassembly of data flow. The link performance feedback is forwarded to CN.

Figure 7:
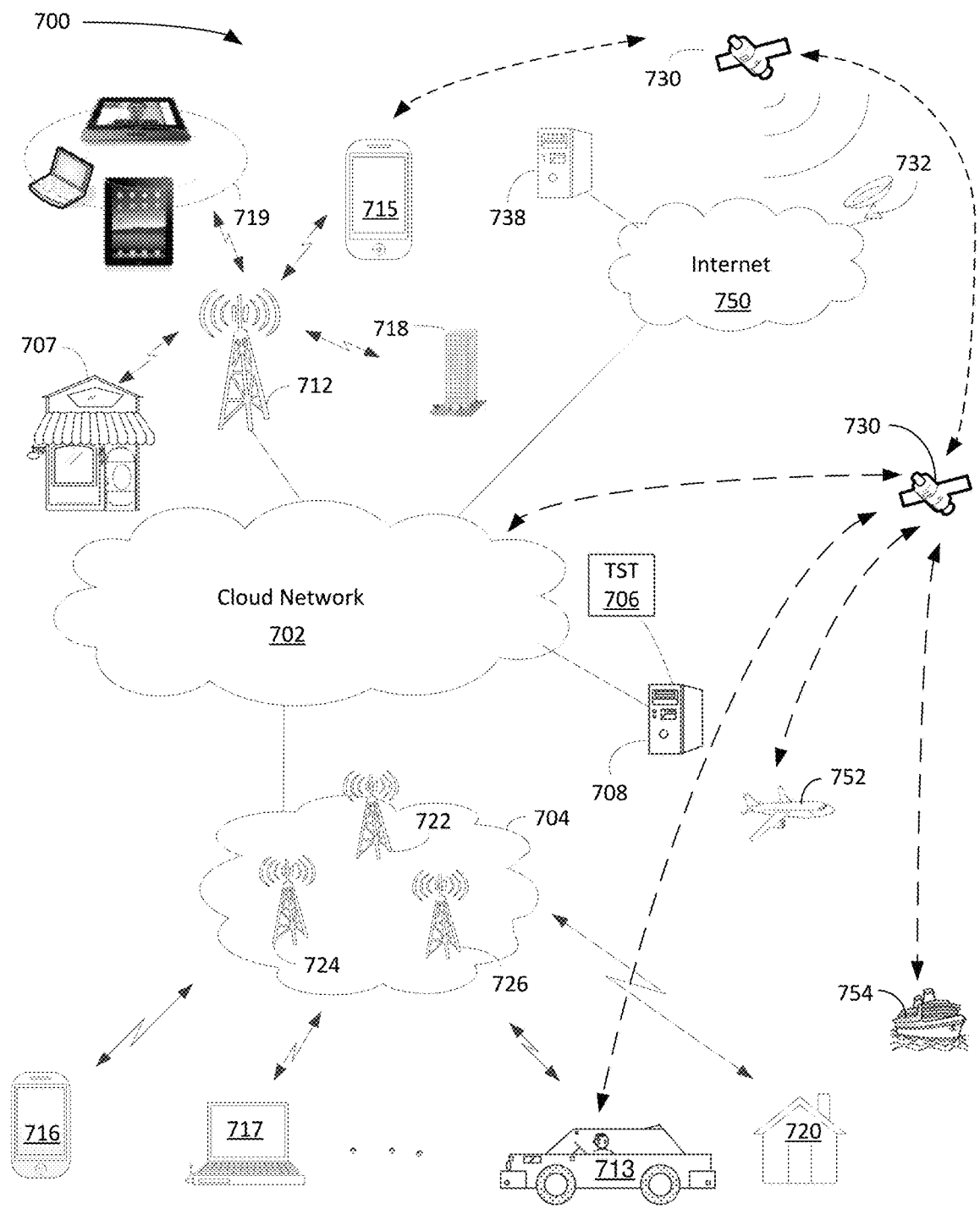
FIG. 7 is a block diagram illustrating an exemplary application of a TST system for transmitting data in accordance with some embodiments of the present disclosure.

FIG. 7 is a block diagram 700 illustrating an exemplary application of a TST system for data transmission in accordance with some embodiments of the present disclosure. Diagram 700 illustrates a server 708 operating TST system 706, communication network 702, switching network 704, Internet 750, satellite/terrestrial network 730, and portable electric devices 713-719. Network or cloud network 702 can be wide area network ("WAN"), metropolitan area network ("MAN"), local area network ("LAN"), or a combination of WAN, MAN, and LAN. It should be noted that the underlying concept of the exemplary embodiment(s) of the present disclosure would not change if one or more blocks (or networks) were added to or removed from diagram 700.

Network 702 includes multiple network nodes, not shown in FIG. 7, wherein each node may include mobility management entity ("MME"), radio network controller ("RNC"), serving gateway ("S-GW"), packet data network gateway ("P-GW"), or HomeAgent to provide various network functions. Network 702 is coupled to Internet 750, UCC server 708, base station 712, and switching network 704.

Server 708, in some embodiments, can be a dedicated network machine capable of providing and/or managing a process of TST system for data transmission or distribution. The TST system can be software, hardware, firmware, and/or a combination of software, firmware, and hardware component. A function of TST system is to provide data transmission between source and destination via one or more available communication networks, channels, or links. In one aspect, the TST system is able to leverage satellite network(s) 730 to provide data transmission to airplanes 752, ships 754, cars 713, buildings 720, UEs 715, and the like.

Switching network 704, which can be referred to as packet core network, includes cell sites 722-726 capable of providing radio access communication, such as 3G ($3^{rd}$ generation), 4G, or 5G cellular networks. Switching network 704, in one example, includes IP and/or Multiprotocol Label Switching ("MPLS") based network capable of operating at a layer of Open Systems Interconnection Basic Reference Model ("OSI model") for information transfer between clients and network servers. In some embodiments, switching network 704 is logically coupling multiple users and/or mobiles 716-720 across a geographic area via cellular and/or wireless networks. It should be noted that the geographic area may refer to a campus, city, metropolitan area, country, continent, or the like.

Base station 712, also known as cell site, node B, or eNodeB, includes a radio tower capable of coupling to various user equipments ("UEs") and/or electrical user equipments ("EUEs"). The term UEs and EUEs are referring to the similar portable devices and they can be used interchangeably. For example, UEs or PEDs can be cellular phone 715, laptop computer 717, iPhone® 716, tablets and/or iPad® 719 via wireless communications. Handheld device 716 can also be a smartphone, such as iPhone®, BlackBerry®, Android®, and so on. Base station 712, in one example, facilitates network communication between mobile devices such as portable handheld device 713-719 via wired and wireless communications networks. It should be noted that base station 712 may include additional radio towers as well as other land switching circuitry.

Internet 750 is a computing network using Transmission Control Protocol/Internet Protocol ("TCP/IP") to provide linkage between geographically separated devices for communication. Internet 750, in one example, couples to supplier server 738 and satellite network 730 via satellite receiver 732.

Satellite network 730, in one example, can provide many functions as data communication as well as global positioning system ("GPS"). While a satellite network 750 can handle transmitting large volume of data, it can also cover a large geographic area. For example, TST system 706 can communicate with UEs 713-719 via satellite network 730, Internet 750, network 702, and/or switching network 704.

An advantage of employing TST system 706 is to enhance data transmission efficiency by using available network links.

Figure 8:
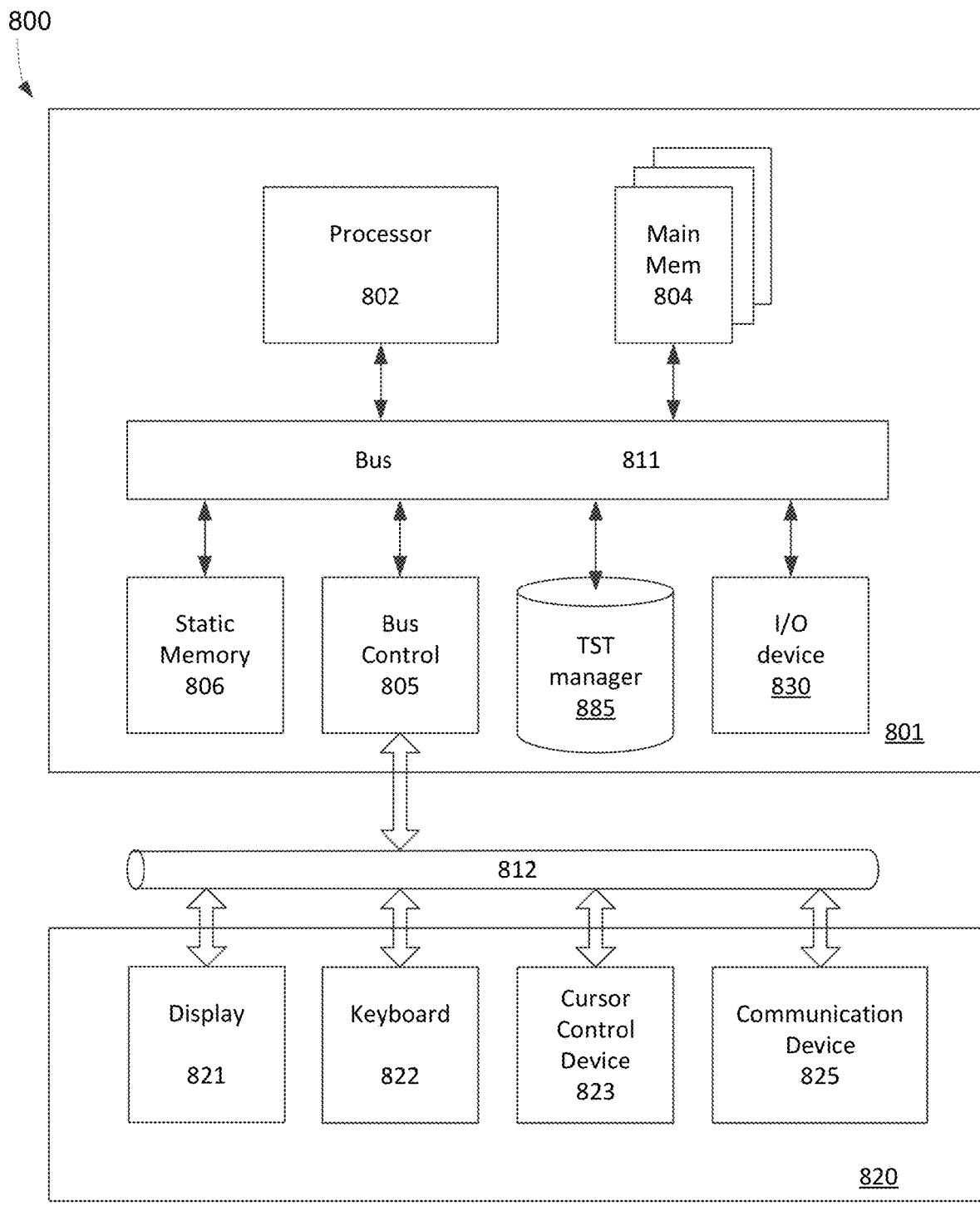
FIG. 8 is a block diagram illustrating an exemplary computer system, host machine, router, home unit, node, or base station capable of providing and facilitating optimal data transfer using a TST system in accordance with some embodiments of the present disclosure.

FIG. 8 is a block diagram 800 illustrating a digital processing system, such as, for example, a computer system, a host machine, a router, a home unit, a node, or a base station capable of processing and transmitting data in accordance with some embodiments of the present disclosure. To simplify forgoing discussion, the term "system" is used to refer to terms as computer system, host, host machine, VM, NIC, switching module(s), and the like. System 800, for example, includes a processing unit 801, interface bus 811, and I/O unit 820. Processing unit 801 includes a processor 802, main memory 804, system bus 811, static memory device 806, bus control unit 805, and TST manager 885 for facilitating data transmission using multiple links. It should be noted that the underlying concept of the exemplary embodiment(s) of the present disclosure would not change if one or more blocks (circuit or elements) were added to or removed from diagram 800.

Bus 811 is used to transmit information between various components and processor 802 for data processing. Processor 802 may be any one of a wide variety of general-purpose processors, embedded processors, or microprocessors, such as ARM® embedded processors, Intel® Core™ Duo, Core™ Quad, Xeon®, Pentium™ microprocessor, Motorola™ 68040, AMD® family processors, or Power PC™ microprocessor. A function of processor 802 is able to execute instructions based on instruction sets stored in memory 804.

Main memory 804, which may include multiple levels of cache memories, stores frequently used data and instructions. Main memory 804 may be RAM (random access memory), MRAM (magnetic RAM), or flash memory. Static memory 806 may be a ROM (read-only memory), which is coupled to bus 811, for storing static information and/or instructions. Bus control unit 805 is coupled to buses 811-812 and controls which component, such as main memory 804 or processor 802, can use the bus. Bus control unit 805 manages the communications between bus 811 and bus 812. Mass storage memory 806, which may be a magnetic disk, optical disk, hard disk drive, floppy disk, CD-ROM, solid state drive ("SSD"), and/or flash memories, are used for storing large amounts of data.

I/O unit 820, in one example, includes a display 821, keyboard 822, cursor control device 823, and communication device 825. Display device 821 may be a liquid crystal device, cathode ray tube ("CRT"), touch-screen display, or other suitable display device. Keyboard 822 may be a conventional alphanumeric input device for communicating information between computer system 800 and computer operator(s). Another type of user input device is cursor control device 823, such as a conventional mouse, touch mouse, trackball, or other type of cursor for communicating information between system 800 and user(s).

Communication device 825 is coupled to bus 811 for accessing information from remote computers or servers through a wide-area communication network. Communication device 825 may include a modem, network interface device, and/or other similar devices that facilitate communication between computer 800 and external network or devices.

While particular embodiments of the present disclosure have been shown and described, it will be obvious to those of ordinary skills in the art that based upon the teachings herein, changes and modifications may be made without departing from this exemplary embodiment(s) of the present disclosure and its broader aspects. Therefore, the appended claims are intended to encompass within their scope all such changes and modifications as are within the true spirit and scope of this exemplary embodiment(s) of the present disclosure.

What is claimed is:

1. A method for facilitating data transmission via one or more communication networks, comprising:

obtaining a data flow containing at least one packet with a first destination at a user terminal ("UT");

fetching a plurality of link characteristics associated with a set of currently available communication links to a core node ("CN");

classifying the data flow to identify a data type of the data flow;

determining whether to split the data flow into a plurality of packets based at least in part on the identified data type of the data flow;

responsive to determining to not split the data flow, transmitting the data flow to the UT using a single link of the set of currently available communication links, the single link selected based at least in part on the identified data type;

responsive to determining to split the data flow:

splitting the data flow into a first packet and a second packet in accordance with the identified data type of the data flow, the first packet to be transmitted by a first communication link of the set of currently available links and the second packet to be transmitted by a second communication link of the set of currently available links;

generating a first packet tag including a first sequence number and a first identifier of the first communication link for the first packet and a second packet tag for the second packet including a second sequence number and a second identifier of the second communication link; and delaying transmission of the second packet relative to transmission of the first packet for a predefined time period based at least in part on the plurality of link characteristics associated with the first communication link and the second communication link so that the first packet and the second packet arrive at the UT at approximately same time frame; and receiving link performance feedback utilizing the first identifier and the second identifier to respectively identify the first communication link and the second communication link.

2. The method of claim 1, further comprising encapsulating the first packet in a first transmission protocol for transmitting an encapsulated first packet via the first communication link in response to the plurality of link characteristics and data type of the first packet.

3. The method of claim 2, further comprising encapsulating the second packet in a second transmission protocol for transmitting an encapsulated second packet via the second communication link in response to the plurality of link characteristics and data type of the second packet.

4. The method of claim 3, further comprising transmitting the encapsulated first packet to the UT via the first communication link.

5. The method of claim 3, further comprising transmitting the encapsulated second packet to the UT via the second communication link.

6. The method of claim 1, further comprising:
updating the plurality of link characteristics based on the link performance feedback.

7. The method of claim 1, wherein generating a first packet tag includes attaching a transmission time stamp.

8. The method of claim 1, wherein obtaining a data flow includes receiving a set of data stream from a communication network and classifying the set of data stream in accordance with a set predefined policy.

9. The method of claim 1, wherein fetching a plurality of link characteristics includes fetching, from a local storage in the CN, current bandwidth, congestion, and transmission rate of a satellite network.

10. The method of claim 1, wherein splitting the data flow includes separating the first packet from the second packet in accordance with the plurality of link characteristics.

11. The method of claim 1, wherein delaying transmission of the second packet includes postponing transmission of the second packet in response to data type of the second packet so that the first packet and the second packet arrive to their destinations within a predefined time frame.

12. The method of claim 1, further comprising:
receiving, by the UT, an encapsulated first packet via the first communication link; and
regenerating the first packet by decapsulating the encapsulated first packet.

13. The method of claim 12, further comprising:
receiving, by the UT, an encapsulated second packet via the second communication link; and
regenerating the second packet by decapsulating the encapsulated second packet.

14. The method of claim 13, further comprising reassembling the data flow to its original form based on the first packet and the second packet in accordance with the first and the second tags.

15. The method of claim 14, further comprising generating link performance feedback based on an error rate during reassembling process of the data flow and forwarding the link performance feedback to the CN.

16. A method for facilitating network communication via multiple networks, comprising:
receiving, by a user terminal ("UT"), an encapsulated first packet via a first link coupling the UT to a core node ("CN"), and generating a first packet by decapsulating the encapsulated first packet;
receiving, by the UT, an encapsulated second packet via a second link coupling the UT to the CN, and generating the second packet by decapsulating the encapsulated second packet;
reassembling a data flow to its original form based on the first packet, the second packet, a first tag received with the first packet and associated with the first packet, and a second tag received with the second packet and associated with the second packet, the first tag including a first sequence number and a first identifier of the first link and the second tag including a second sequence number and a second identifier of the second link;
determining a first link status associated with transmission of the first packet and a second link status associated with transmission of the second packet;
generating link performance feedback based on the first link status, the second link status, and a detected error rate from a process of restoring the data flow and forwarding the link performance feedback to the CN; and
sending link performance feedback utilizing the first identifier and the second identifier to identify link performance feedback for the first link and the second link, respectively.

17. The method of claim 16, further comprising:
obtaining the data flow containing at least one packet with a destination at the UT;
fetching link characteristics associated with a set of currently available links to the CN; and
splitting the data flow into the first packet and the second packet in accordance with data type of the data flow.

18. The method of claim 16, further comprising:
generating a first packet tag including a first sequence number for the first packet and a second tag for the second packet; and
delaying transmission of the second packet for a predefined time period in response to the plurality of link characteristics so that the first packet and the second packet arrive to the UT at approximately same time frame.

19. A network apparatus for facilitating data transmission via multiple communication networks, comprising:
a receiver configured to obtain a data flow containing at least one packet for traveling to a first destination at a user terminal ("UT");
a link selector coupled to the receiver and operable to fetch a plurality of link characteristics associated with a set of currently available links connected to a core node ("CN");
a data flow classifier coupled to the link selector and configured to classifying the data flow to identify a data type of the data flow;
a flow split module ("FSM") coupled to the link selector and configured to determine whether to split the data flow into a plurality of packets based on the identified data type, the flow split module further configured to, responsive to determining to split the data flow, split the data flow into a first packet and a second packet in accordance with the identified data type of the data flow, the first packet to be transmitted by a first link of the set of currently available links and the second packet to be transmitted by a second link of the set of currently available links;
a tag module coupled to the flow split module and operable to generate a first packet tag for the first packet and a second packet tag for the second packet responsive to the flow split module determining to split the data flow, the first packet tag including a first sequence number and a first identifier of the first link and the second packet tag including a second sequence number and a second identifier of the second link; and
a delay module coupled to the tag module and configured to, responsive to the flow split module determining to split the data flow, delay transmission of the second packet relative to transmission of the first packet for a predefined time period based at least in part on the plurality of link characteristics associated with the first link and the second link so that the first packet and the second packet arrive at the UT at approximately same time frame, and, responsive to the flow split module determining to not split the data flow, not delaying transmission of the data flow,
wherein the link selector is further configured to receive link performance feedback utilizing the first identifier and the second identifier to respectively identify the first communication link and the second communication link.

20. The network apparatus of claim 19, wherein the UT includes a reassembly unit configured to restore the data flow resembling original data flow based on the first packet tag and the second packet tag.

* * * * *